July 6, 1954
L. E. NORTON
2,683,217
FREQUENCY CONTROL OF PULSED AND
CONTINUOUS-WAVE OSCILLATORS
Filed Nov. 7, 1950
5 Sheets-Sheet 1
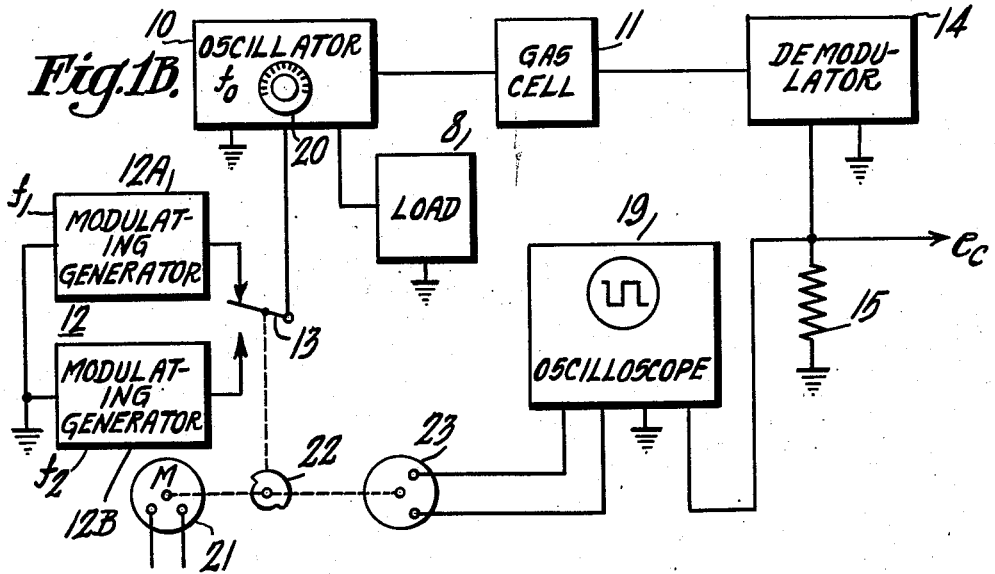
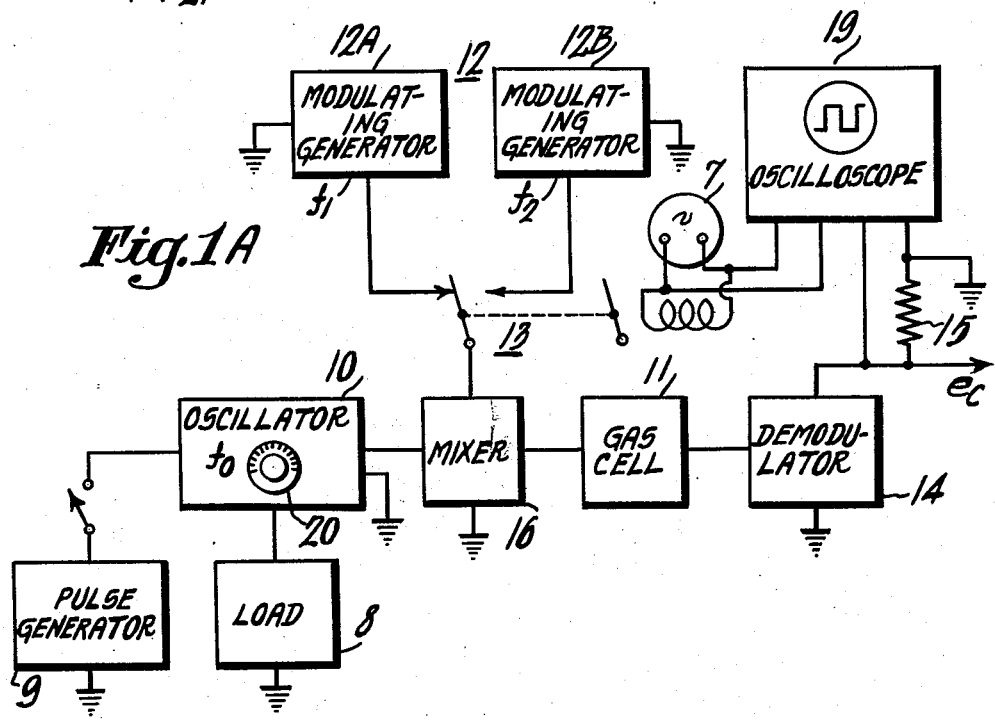
INVENTOR
*LOWELL E. NORTON*
BY
ATTORNEY

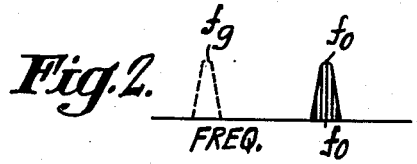
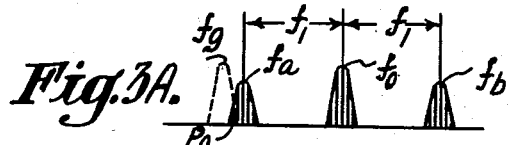
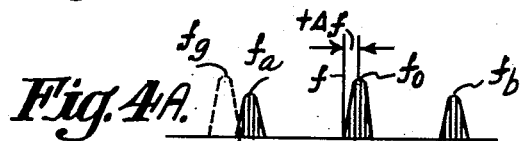
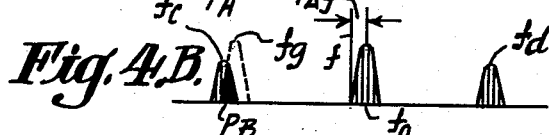
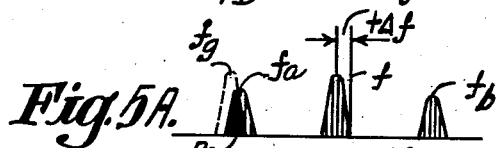
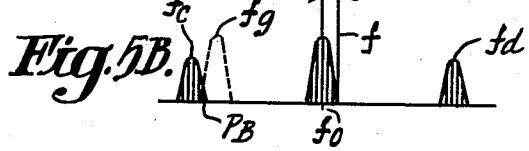
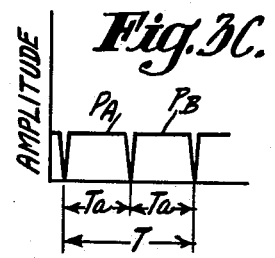
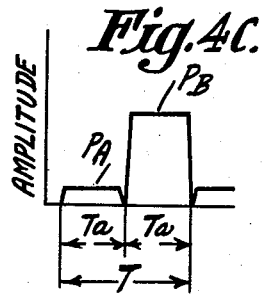
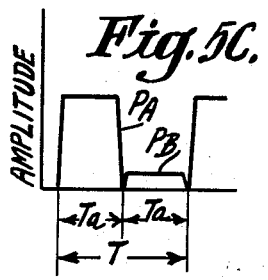

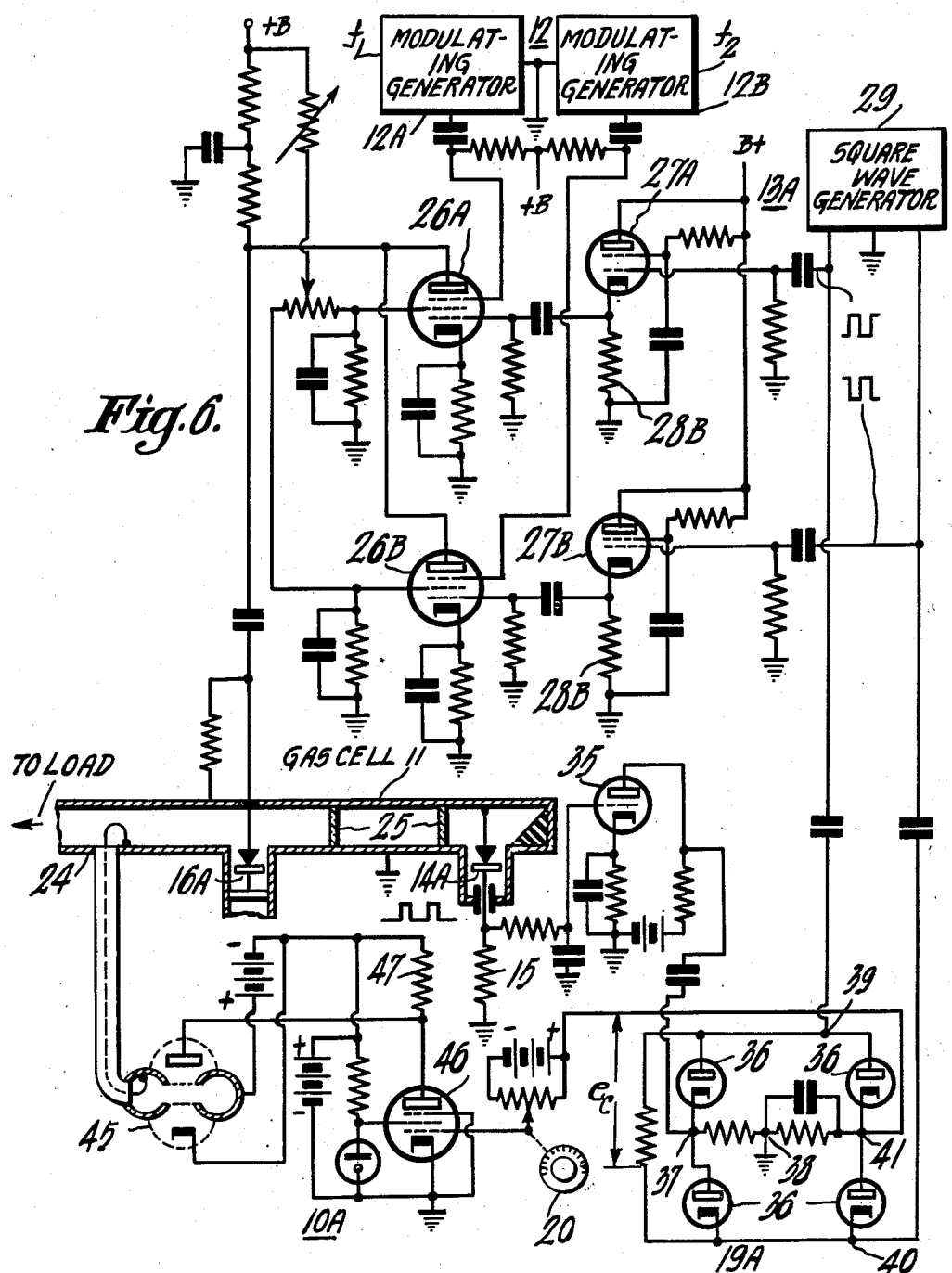

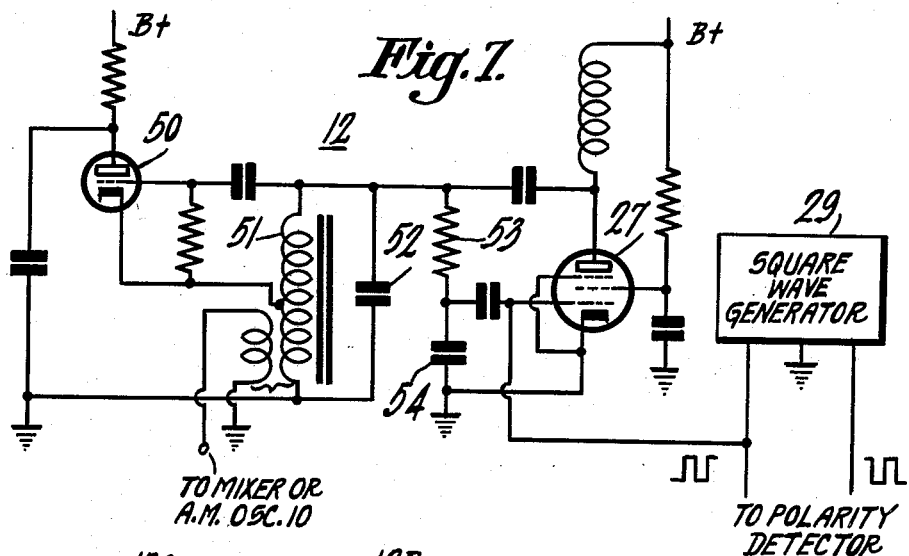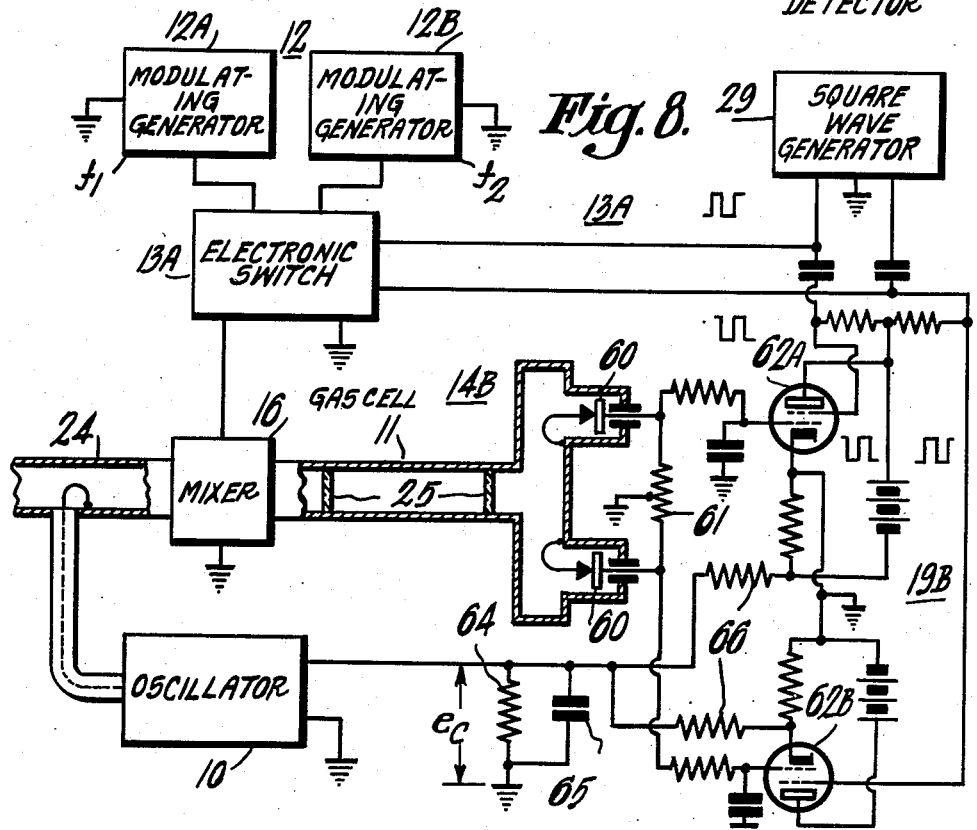

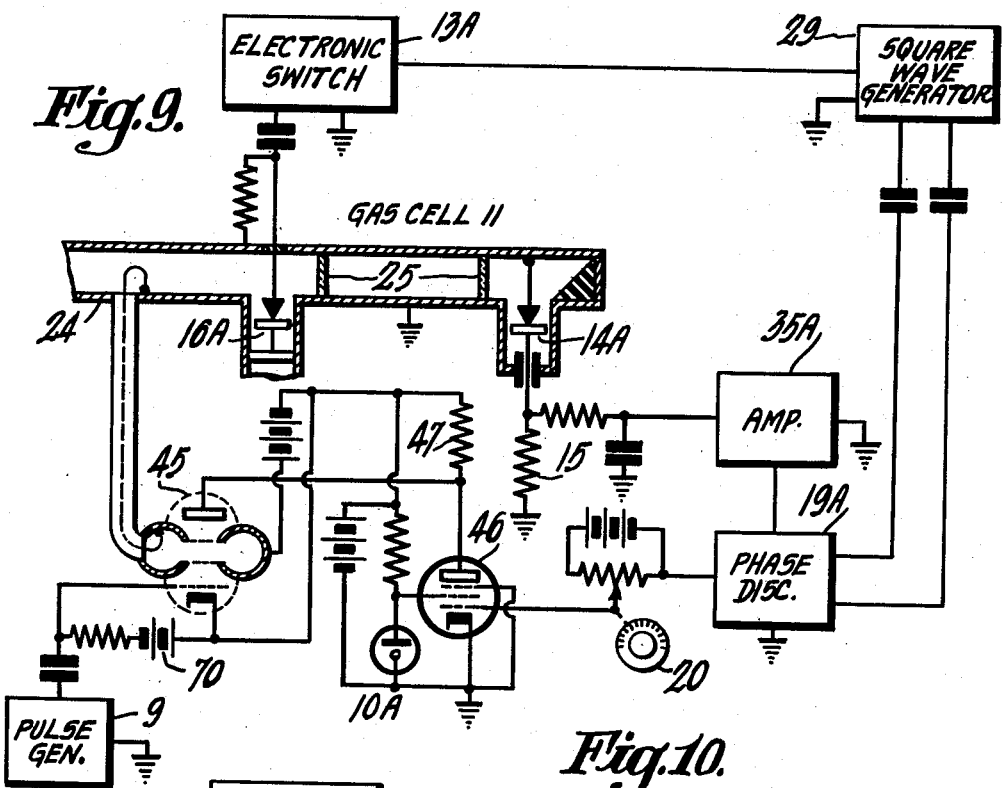
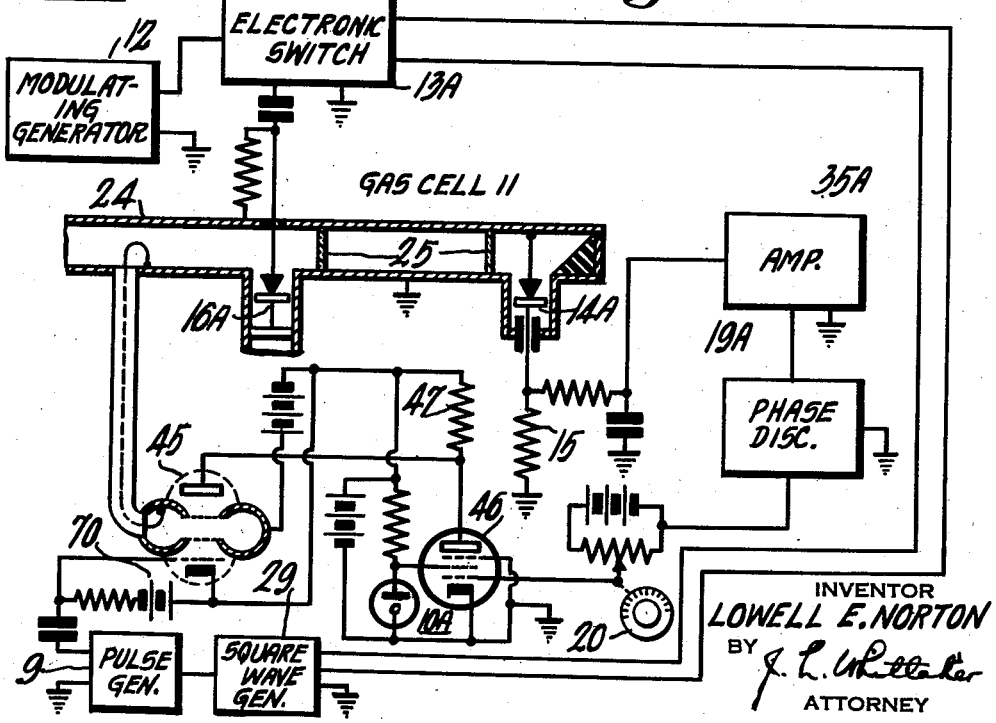

Patented July 6, 1954

2,683,217

UNITED STATES PATENT OFFICE 2,683,217

FREQUENCY CONTROL OF PULSED AND CONTINUOUS-WAVE OSCILLATORS

Lowell E. Norton, Princeton, N. J., assignor to Radio Corporation of America, a corporation of Delaware Application November 7, 1950, Serial No. 194,442

11 Claims. (Cl. 250—36)

This invention relates to methods and systems for controlling the frequency of oscillators, either continuous-wave or pulsed, and particularly to frequency-stabilization of microwave oscillations as generated, for example, by klystrons, magnetrons and the like.

In accordance with the invention, the generated oscillations are modulated alternately at two different frequencies to produce a pair of sidebands having frequencies respectively on opposite slopes of the response characteristic of a frequency-selective standard which, for microwave frequencies, is a body of suitable gas confined at pressure for which it exhibits sharp molecular resonance at a fixed frequency. By demodulation of the sideband energies selectively passed by the standard, there are alternately produced envelopes of sidebands outputs whose variation in relative amplitude is an accurate measure of the sense and extent of deviation of the frequency of the generated oscillations from a desired value.

To produce a direct-current or voltage reversing in polarity with change in sense of the frequency deviation and of magnitude corresponding with the extent of the deviation, the aforesaid alternate envelopes of sidebands outputs may be impressed upon one input circuit of a phase or coincidence detector having a second input circuit whose excitation is reversed in polarity at a rate which is in integral ratio relation to the rate at which the modulation-frequency of the oscillator, pulsed or continuous-wave, is alternated. The output of the detector may be used for indicating the frequency deviation of the oscillation generator; in addition or alternatively, the detector output may be utilized automatically to regulate or stabilize the frequency of the oscillator.

The invention further resides in methods and systems having the features of novelty and utility hereinafter described and claimed.

For a more detailed understanding of the invention and for illustration of systems embodying it, reference is made to the accompanying drawings in which:

Figs. 1A and 1B are block diagrams of microwave oscillator systems utilizing the invention;

Figs. 2, 3A–3C, 4A–4C and 5A–5C are explanatory figures referred to in discussion of the invention;

Fig. 6 schematically illustrates an automatic frequency control system generically of the type shown in Figs. 1A and 1B;

Fig. 7 schematically illustrates a modification of components shown in Figs. 1A, 1B and 6;

Fig. 8 is a modification of Fig. 6 utilizing a different type of demodulator and phase discriminator;

Fig. 9 is a modification of Fig. 6 in which the oscillator is pulse-modulated; and Fig. 10 is a modification of Fig. 9 in which switching and phase-reference pulses are derived from the pulse modulator.

In the system diagrammatically shown in Fig. 1A, the block 10 generically represents a klystron, magnetron or other oscillator for supplying microwave energy to an antenna or other load 8. The oscillator may be continuous wave or it may be pulse-modulated, as when used in object location, navigational aid systems and the like, by a pulse generator 9 of any suitable type.

When pulse-modulated, the output of the oscillator as indicated in Fig. 2 is spectral and substantially symmetrical about the center frequency $f_0$ determined by the operating parameters of the oscillator including the cavity dimensions which may be set by tuning means generically represented by dial 20.

Part of the output of the oscillator 10 is transmitted by a waveguide, or other suitable transmission line, to a gas-absorption cell 11 containing at suitably reduced pressure a gas which exhibits sharp molecular resonance at a frequency $f_g$ (Fig. 2) suitably displaced from the desired operating frequency of the oscillator 10. In the copending application of William D. Hershberger Serial No. 1,240, filed January 18, 1948, there are identified a substantial number of gases including ammonia which exhibit molecular resonance at various fixed frequencies in the microwave spectrum. The number of standard microwave frequencies so provided may be increased by subjecting the gas to an electrostatic field or to an electromagnetic for utilization of the Stark or Zeeman effect in displacement or splitting of a gas line.

As by a modulator 12 and a periodically operating switch 13, the microwave energy in advance of the gas cell 11 is alternately modulated at two relatively low frequencies $f_1$ and $f_2$. When the oscillator is modulated at frequency $f_1$, there are produced upper and lower sidebands $f_a$ and $f_b$ whose center frequencies are displaced from the oscillator carrier frequency $f_0$ by modulating frequency $f_1$. The modulating frequency is so selected that one or the other of these sidebands, for example the lower as shown in Fig. 3A, overlaps the absorption curve of the gas in cell 11.

When modulation of frequency $f_2$ is applied, there is produced a second pair of sidebands $f_c$ and $f_d$ respectively higher and lower than the oscillator frequency and displaced therefrom by a frequency $f_2$. The frequency $f_2$ is so chosen that assuming the oscillator 10 is on proper frequency, one or the other of the sidebands, specifically the lower as in Fig. 3B, also falls on the selected absorption curve of the gas.

Comparing Figs. 3A and 3B, it is seen that the sidebands $f_a$ and $f_c$ produced by the alternate modulation at frequencies $f_1$ and $f_2$ fall on opposite slopes of the absorption curve of the gas cell. Thus, when the oscillator 10 is on proper frequency, the microwave energy pulses $P_A$ and $P_B$ passed by the gas cell are substantially equal.

The output of the cell 11 as demodulated by rectifier 14 of the diode or crystal type, after filtering is therefore, as shown in Fig. 3C, a repeating series of alternate envelopes $P_A$ and $P_B$, all of equal amplitude. The period of the switching frequency is T. Modulating frequency $f_1$ is applied during period $T_a$ and $f_2$ during $T_b$.

Assuming the frequency of the generated oscillations drifts or shifts to a higher frequency, all of the sidebands are similarly displaced in the frequency spectrum in sense and to an extent corresponding with the positive frequency deviation $(+\Delta f)$. Thus, as shown in Fig. 4A, when the modulating frequency $f_1$ is applied, the overlap between the righthand slope of the response curve of the gas and the sideband $f_a$ is much less than in Fig. 3A; whereas the overlap between the response curve and the sideband $f_c$ existent when modulating frequency $f_2$ is applied is much greater in Fig. 4B than in Fig. 3B. Consequently, as shown in Fig. 4C, for this sense of deviation of the oscillator frequency, the output envelopes $P_A$ occurring during application of modulating frequency $f_1$ are smaller than the output envelopes $P_B$ occurring during modulation at frequency $f_2$; the relative amplitude of the envelopes corresponding with the extent of the frequency deviation $(+\Delta f)$.

If, on the other hand, the frequency of oscillator 10 shifts to a lower frequency, the overlap of the sideband $f_a$ with the response curve of the gas cell is much greater (Fig. 5A) than existent for null deviation of the oscillator frequency (Fig. 3A) and during modulation at frequency $f_2$, the overlap of sideband $f_c$ is less (Fig. 5B) than existent for null frequency deviation (Fig. 3B). Accordingly, for a negative frequency deviation $(-\Delta f)$, the envelopes $P_B$ existent during modulation at frequency $f_1$ are greater in amplitude than the envelopes $P_A$ occurring during modulation by frequency $f_2$; the relative amplitude corresponding with the extent of the deviation $(-\Delta f)$.

As apparent from inspection of Fig. 4C and Fig. 5C and the foregoing discussion, the output of the demodulator 14 is a square wave which reverses in phase with change in the sense of frequency deviation of oscillator 10 and is of amplitude corresponding with the extent of the frequency deviation.

For monitoring of the frequency of oscillator 10, the output of demodulator 14 may be impressed, as by a coupling impedance 15, upon one deflection circuit of an oscilloscope 19 whose sweep is derived from or synchronized with the rate at which the modulating frequencies $f_1$ and $f_2$ are alternated. In the particular arrangement shown in Fig. 1A, this sweep repetition rate is derived from the A. C. source 7 which energizes the switch 13 to change from one modulating frequency to the other. Specifically, the modulator 12 may comprise two oscillators 12A and 12B alternately connected to the mixer 16 by the movable contact of an electromagnetic vibrator whose coil is energized from the source 7. Alternatively, and as later herein shown, a single modulating oscillator may be used and the switch employed periodically to vary the circuit constants for alternate generation of modulating frequencies $f_1$ and $f_2$.

By observing the oscilloscope 19, the operator can determine whether the oscillator is on frequency (Fig. 3C), above frequency (Fig. 4C) or below frequency (Fig. 5C) and may operate a tuning control 20 of the oscillator 10 until the pulses $P_A$ and $P_B$ are of equal amplitude (Fig. 3C) corresponding with null frequency deviation. Preferably, however, as later described, the output of the demodulator 14 is used automatically to maintain null or negligible deviation of the frequency of oscillator 10.

When the oscillator 10 is continuous wave and modulated at audio or video frequencies for transmission of intelligence, the modulating frequencies $f_1$, $f_2$ and the switching frequency of them should be outside the range of the intelligence-conveying frequencies: for example, the switching frequency may be 20 cycles per second and the modulating frequencies $f_1$, $f_2$ may be of the order of 5 megacycles per second.

The arrangement shown in Fig. 1B is generically similar to that shown in Fig. 1A. In this modification, the switch for the two-frequency modulator 12 is operated by a cam 22, or equivalent, driven at desired speed by a motor 21 which may be an electric motor excited either from an A. C. source or a D. C. source. The sweep voltage or the sweep synchronizing voltage for one set of deflection plates of the oscilloscope 19 is in this case supplied by a small alternator 23 driven in synchronism with the cam 22 and therefore provides a sweep rate which is in integral ratio relation to the switching rate of the modulation.

In both the systems of Figs. 1A and 1B as well as those later described, the oscillators 10 may either be pulsed or continuous wave. When the oscillator is continuous wave, the carrier and sideband energies are monochromatic frequencies rather than spectral (as shown in Figs. 2, 3A, 3B, 4A, 4B, 5A and 5B) but the relationships between the sidebands and the response curve of the frequency standard are the same as above described.

The system shown in Fig. 6 is generically similar to that of Fig. 1A and Fig. 1B but differs in that the switching of the modulating frequencies for alternate impression upon the mixer is effected electronically and also in that it discloses an arrangement for automatically minimizing frequency deviations of the oscillator.

In Fig. 6, the oscillator 10A to be stabilized is a klystron 45 coupled by a small loop, or probe, to a waveguide 24 for transmitting the generated oscillations to a gas cell 11 having windows 25, 25 which confine the gas and yet permit transmission of microwave energy through the cell, the unabsorbed energy being rectified by the demodulator 14A at a terminal section of the waveguide. A crystal rectifier 16A or equivalent non-linear resistance is suitably coupled to the waveguide between the oscillator coupling loop and the gas cell 11 to serve as a mixer upon which the modulating frequencies $f_1$ and $f_2$ are alternately impressed.

Specifically, the mixer 16A is included in the output circuits of tubes 26A and 26B having input electrodes connected to the modulation frequency generators 12A and 12B. The tubes 26A and 26B are effectively alternately turned on and off under control of switching tubes 27A and 27B having cathode resistors 28A and 28B respectively included in the cathode circuits of the tubes 26A and 26B. The tubes 27A and 27B are under control of a square wave generator 29 whose output is applied to control electrodes of the tubes 27A and 27B in 180° phase relation so that concurrently with turning tube off of one tube, the other is turned on, and vice versa.

In consequence, the output of demodulator 14A, or equivalent non-linear resistance, as appearing for example across the impedance 15, is in the form of a square wave with amplitude alternately proportional to $P_A$ and $P_B$ in Figs. 3C, 4C, and 5C. The sense or phase of this square wave varies with change from positive to negative frequency deviation and whose relative amplitude is a measure of the magnitude of the frequency deviation.

To produce a direct-current voltage $e_c$ (Fig. 6) whose polarity corresponds with the sign of the frequency deviation and whose magnitude corresponds with the extent of the frequency deviation, the square wave output of the demodulator 14A is impressed upon one input circuit of a coincidence detector or phase discriminator 19A upon whose other input circuit is impressed the output of the switching pulse generator 29. Specifically, the phase discriminator may, as in Fig. 6, comprise two pairs of rectifiers on non-linear resistances 36 poled as shown. The switching pulses which serve as a fixed phase-reference are applied to the input terminals 39 and 40 of the phase discriminator network and the output of the demodulator 14A, preferably after amplification by an amplifier stage including tube 35, is impressed upon the input terminals 37, 38. The direct-current voltage $e_c$ appearing between the output terminals 38 and 41 of network 19A is of one polarity or another in correspondence with the sense of the frequency deviation of oscillator 10A and is of zero value when the oscillator is operating at proper frequency.

For automatic stabilization of the frequency of oscillator 10, the output voltage $e_c$ of the detector 19A is applied to change the potential of a frequency-determining electrode of the klystron 45. Specifically, in the arrangement shown in Fig. 6, the control voltage $e_c$ is applied to a grid of a control tube 46 effective to regulate the potential difference between the reflex anode and cavity of the klystron. With change of the control voltage $e_c$, the current drawn by tube 46 through the resistor 47 is varied so to change the frequency-determining potential between the aforesaid electrodes of the klystron. This mode of controlling the frequency of a reflex klystron is more fully described in copending applications including my application Serial No. 8,246 and need not here further be described.

In any of the arrangements herein described, the modulator 12 may be a single oscillator whose frequency is alternately shifted between frequencies $f_1$ and $f_2$. For example, as shown in Fig. 7, the oscillator may include a tube 50 whose frequency-determining circuit includes inductance 51 and capacitor 52. The tuned circuit of the oscillator is shunted by the resistor-capacitor network 53—54 of a reactance tube 27 whose control grid is connected to the switching wave generator 29. The application of the square wave output of the switching generator to the grid of the reactance tube 27 causes the output frequency of oscillator 12 to alternate between two frequencies which by selection of circuit constants corresponds with frequencies $f_1$ and $f_2$ having the relations described in discussion of Figs. 2–5B. The output of oscillator 12 may be impressed, as by the coupling coil arrangement shown in Fig. 7, upon the mixer upon which is also impressed the output of the oscillator 10 or equivalent alternatively as in any of the systems herein disclosed the modulating frequencies may be applied, without a mixer, to amplitude-modulate the potential of an electrode of the oscillator tube provided known precautions are taken to minimize concurrent frequency-modulation of the carrier.

The system shown in Fig. 8 is generally similar to that shown in Fig. 6 but utilizes another form of phase detector and demodulator. Specifically, the phase discriminator 19B of Fig. 8 comprises two tubes 68A and 68B whose screen grids are connected to output terminals of the switching generator 29 for out-of-phase excitation by the square wave output thereof. The control grids of these tubes are connected to the terminals of the center-tapped load resistor 61 for the diodes 60—60 serving as the demodulator 14B for the modulated microwave energy passed by the gas cell 11. The D. C. output of the tubes 62A and 62B, as integrated by the resistor-capacitor network 64—65, is a direct-current voltage $e_c$ of polarity corresponding with the deviation of oscillator 10 from the desired frequency, of magnitude corresponding with the extent of the deviation, and is of null value when the frequency deviation is of zero or negligible value. The resistors 66 are decoupling resistors and are of magnitude substantially greater than the resistance of resistor 64. The method of operation of Fig. 8 is that exemplified by Figs. 2 to 5C and need not be repeated.

The system shown in Fig. 9 is the same as that of Fig. 6 except that the potential of the control grid of the klystron is periodically varied for pulsed operaton as in radar and navigational aid systems. Specifically, the control grid may be negatively biased beyond cutoff by battery 70 or equivalent D. C. source and is periodically turned on by positive pulses from pulse generator 71. Alternatively, the control grid may be biased to give output by battery 70 or equivalent and periodically turned off by negative pulses from the generator 71. The pulsing rate of generator 9 for this system should be considerably higher or faster than the switching rate of the switching pulse generator 29.

When the pulsing rate and the sideband switching rate may be related by an integral ratio, the switching pulse generator 29 may be replaced, as shown in Fig. 10, by a multi-vibrator or equivalent frequency divider 29A triggered by the output of the pulse generator 9 and having a push-pull output for application to one input circuit of the coincidence detector 19A and to the electronic switch 13A which effects alternate switching of the modulating frequencies $f_1$ and $f_2$.

When the frequency of the generated oscillations or a reasonably low harmonic thereof is much lower in the frequency spectrum than a molecular resonance frequency of any gas; i. e. when for example, frequency $f_0$ of the order of hundreds or thousands of kilocycles per second, a piezo-electric crystal or other high-Q frequency selective element or frequency standard is used in replacement of the gas cell for detection and/or correction of the frequency drift of the oscillator and the modulation frequencies $f_1$ and $f_2$ are chosen to fall on opposite slopes of the response curve of the standard, as hereinabove discussed in connection with Figs. 2–5C.

It shall be understood the invention is not limited to the systems specifically shown and that changes and modifications may be made within the scope of the appended claims.

What is claimed is:

1. A system for determining the sense of deviation of oscillations from a desired carrier frequency comprising means for modulating said oscillations alternately by two different modulating frequencies repeatedly successively to produce discrete closely adjacent sideband frequencies, a circuit element upon which said discrete sideband frequencies are impressed and which is sharply resonant at a fixed frequency between the discrete sideband frequencies for null deviation of the carrier frequency, and non-linear resistance means for demodulating the sideband energies transmitted by said circuit element to produce outputs normally of different amplitude and the sign of whose differential amplitude reverses with reversal of the deviation of the carrier frequency.

2. A system as in claim 1 in which the modulating means comprises two modulating-frequency generators, and switching means therefor periodically operated at lower frequency alternately to connect said generators in circuit.

3. A system as in claim 1 in which there is additionally included a mixer upon which the carrier frequency is impressed and in which the switching means alternately connects said modulating frequency generators to the mixer.

4. A system as in claim 1 in which the switching means alternately connects the modulating frequency generators for amplitude-modulation of the carrier energy.

5. A system as in claim 1 in which the modulating means includes a modulating oscillator and in which switching means periodically changes the circuit parameters of said oscillator for alternate generation of one and then the other of the two modulating frequencies.

6. A system as in claim 5 additionally including a mixer upon which the carrier frequency is impressed and which is continuously connected to said oscillator circuit, the resulting sideband frequency alternating between the aforesaid two adjacent frequencies with periodic changing of the oscillator circuit parameters by said switching means.

7. A system as in claim 5 in which the modulating oscillator amplitude modulates the carrier to produce a sideband frequency alternating between the aforesaid two adjacent frequencies with periodic changing of the oscillator circuit parameters by said switching means.

8. A system as in claim 1 in which the sharply resonant circuit element is a confined body of gas exhibiting molecular resonance at the aforesaid fixed frequency.

9. A system for stabilizing the frequency of an oscillation generator comprising means for modulating the generated oscillations alternately to produce discrete closely adjacent sideband frequencies, a circuit element sharply resonant at a fixed frequency midway of said adjacent discrete sideband frequencies for null frequency deviation of the generated oscillations, non-linear resistance means for demodulating sideband energies transmitted by said circuit element to produce pulses of equal magnitude for null deviation of frequency of the oscillations and of relative magnitude changing in algebraic sign upon reversal of the sense of deviation, a network upon which said pulses are impressed to produce an error-signal of polarity reversing with change in sign of the relative amplitude of said pulses, and connections for applying said signal to said generator to minimize the frequency deviations of the generated oscillations.

10. A system as in claim 9 in which the first named means includes an electronic switch which also produces for said network reference pulses having the same repetition frequency as the sideband pulses but of fixed phasing.

11. A system as claimed in claim 1 wherein said modulating means comprises means for pulse modulating said carrier frequency oscillations.

References Cited in the file of this patent

UNITED STATES PATENTS

| Number | Name | Date |
| --- | --- | --- |
| 2,466,931 | Crandell | Apr. 12, 1949 |
| 2,560,365 | Norton | July 10, 1951 |